United States Patent [19]

Wiegner et al.

[11] Patent Number: 4,968,318
[45] Date of Patent: Nov. 6, 1990

[54] RED MIXTURES OF DISPERSE AZO DYESTUFFS

[75] Inventors: Dieter Wiegner, Odenthal; Wolf-Dieter Elsner, Burscheid, both of Fed. Rep. of Germany

[73] Assignee: Bayer Aktiengesellschaft, Leverkusen, Fed. Rep. of Germany

[21] Appl. No.: 452,906

[22] Filed: Dec. 19, 1989

[30] Foreign Application Priority Data

Dec. 28, 1988 [DE] Fed. Rep. of Germany ....... 3844067

[51] Int. Cl.$^5$ .............................................. C09B 29/00
[52] U.S. Cl. .......................................... 8/639; 8/691; 8/921; 8/922; 8/924
[58] Field of Search ..................... 8/639, 691

[56] References Cited

U.S. PATENT DOCUMENTS

| | | | |
|---|---|---|---|
| 4,452,609 | 6/1984 | Hamprecht | 8/694 |
| 4,479,899 | 10/1984 | Hamprecht | 8/639 |

FOREIGN PATENT DOCUMENTS

| | | |
|---|---|---|
| 25903 | 4/1981 | European Pat. Off. . |
| 216242 | 4/1987 | European Pat. Off. . |
| 813906 | 5/1959 | United Kingdom . |
| 896232 | 5/1962 | United Kingdom . |
| 2030167 | 4/1980 | United Kingdom . |

*Primary Examiner*—A. Lionel Clingman
*Attorney, Agent, or Firm*—Sprung Horn Kramer & Woods

[57] ABSTRACT

Mixtures of at least two different dyestuffs of the formulae

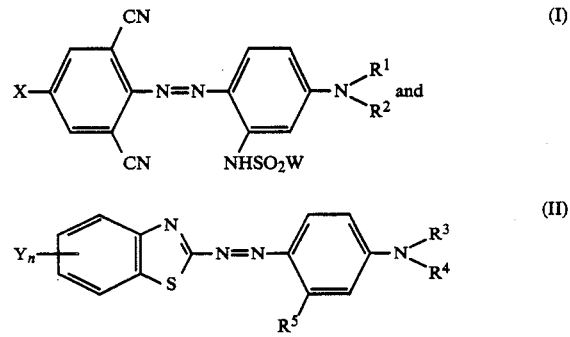

in which the symbols have the meanings mentioned in the text represent a low-priced replacement for the known anthraquinone dyestuff Disperse Red 60.

In the dyeing of mixed yarn, they are even superior with respect to sublimation fastness and cotton staining.

5 Claims, No Drawings

RED MIXTURES OF DISPERSE AZO DYESTUFFS

The present invention relates to mixtures of azo dyestuffs for the dyeing of polyester and polyamide fibres, which are suitable as replacement for the anthraquinoid C.I. Disperse Red 60 (C.I. No. 60756).

Disperse Red 60 has been until now without doubt the most important red disperse dyestuff, since it leads to particularly clear dyeings which have high lightfastness properties. On the other hand, this dyestuff has the disadvantage of low color strength, which results in a considerable increase in costs in particular in the dyeing in higher color depths.

Further advantages are the considerable cotton staining in the dyeing of the corresponding polyester mixed fibres and the sensitivity of Disperse Red 60 to metal ions in the dyebath, which is the reason that complexing agents must often be added to the bath.

Finally, shifts in hue can occur, if the polyester dyeings are not thoroughly washed after the alkaline reductive after-treatment.

In order to eliminate at least some of the deficiencies of the anthraquinone dyestuff, it has already been proposed to replace Disperse Red 60 by selected red azo dyestuffs (cf. German Auslegeschriften Nos. 2,711,130, 2,937,329 and 3,533,527).

However, while the dyestuffs of the first-mentioned patent publication, while otherwise having excellent properties, are not fully satisfactory with respect to their affinity, the dyestuffs according to German Auslegeschriften Nos. 2,937,329 and 3,533,527 are no equivalent replacement for Disperse Red 60 due to their reduced sublimation fastness.

Nor do the azo dyestuffs according to German Auslegeschrift No. 2,935,011, which have a similar hue to Disperse Red 60, come close to the high fastness level of the anthraquinone type.

It has now been found that low-priced replacement products for the anthraquinone dyestuff in question which is excellent in terms of practical application can be obtained by means of a special combination of selected azo dyestuffs.

The invention accordingly relates to mixtures of azo dyestuffs containing
(a) at least a dyestuff of the formula (I)

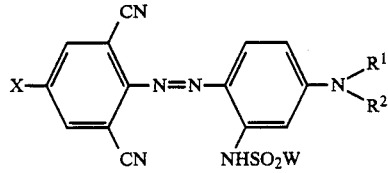

and
(b) at least a dyestuff of the formula (II)

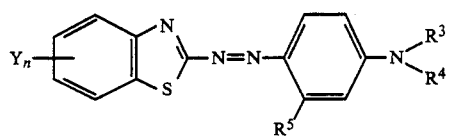

in which
n represents the numbers 1 or 2,
X represents $C_1$–$C_4$-alkyl, $C_1$–$C_4$-alkoxy or cyclohexyl,
Y represents Cl, $NO_2$, CN, SCN or $SO_2$,
$R^1$, $R^2$ represent $C_1$–$C_6$-alkyl or $C_1$–$C_4$-alkoxy-$C_2$–$C_4$-alkyl,
$R^3$ represents $C_1$–$C_6$-alkyl or $R^4$,
$R^4$ represents $C_2H_4CN$, $C_2H_4OCOW$ or $C_2H_4OCOOW$,
$R^5$ represents H or $CH_3$ and
W represents C–$C_4$-alkyl or phenyl.

Preference is given to dyestuffs of the formulae mentioned in which
X represents methyl, methoxy, t-butyl or cyclohexyl,
Y represents nitro,
$R^1$ and $R^2$ represent ethyl or n-propyl,
$R^3$ represents ethyl, n-butyl or $C_2H_4CN$,
$R^4$ represents $C_2H_4OCOW$ or, if $R^3$ is ethyl/n-butyl, $C_2H_4CN$,
$R^5$ represents H and
W represents methyl, ethyl or n-propyl.

Particular preference is given to dyestuffs of the formulae I or II in which
X represents methyl,
Y represents 6-nitro,
$R^1$ and $R^2$ represent ethyl or n-propyl,
W represents methyl or ethyl and
$R^3$, $R^4$, $R^5$ have the abovementioned meaning.

The amount of the individual components in the mixtures according to the invention is in general 10–90% by weight of component I and 90–10% by weight of component II, the sum of which must of course add up to 100%.

A weight ratio of I/II of about 70:30 is particularly preferred.

Mixtures of the dyestuffs

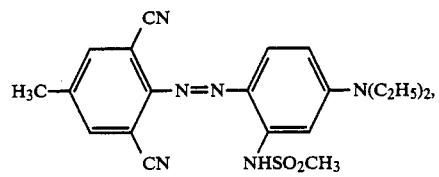

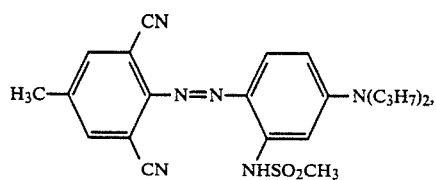
(B)

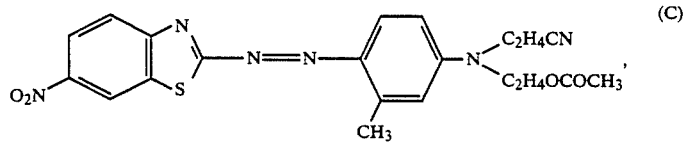
(C)

in which the mixing ratio of A and/or B to C is 90:10 to 10:90, preferably 80:20 to 20:80 and particularly preferably about 70:30 are very particularly preferred.

If the mixture according to the invention contains not only component A but also component B, virtually any desired mixing ratios are possible. However, in this case, too, the ratio of A:B is preferably about 70:30.

Further particularly suitable individual dyestuffs are those of the formulae

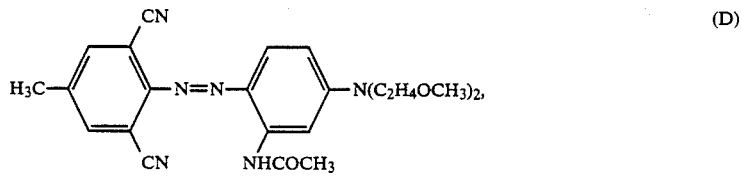
(D)

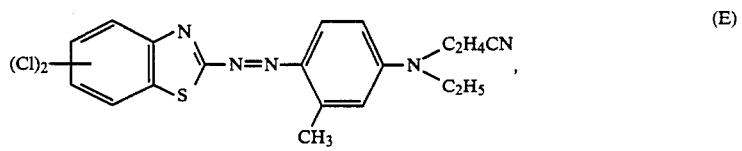
(E)

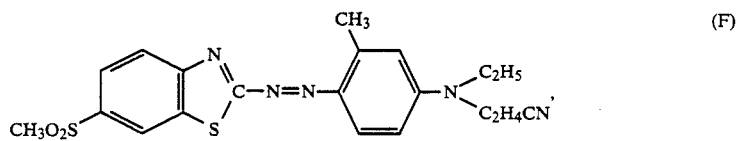
(F)

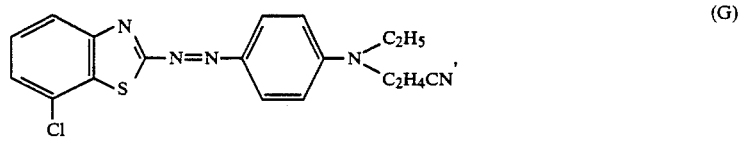
(G)

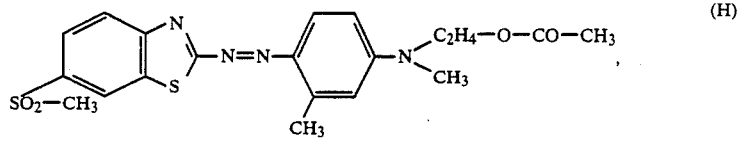
(H)

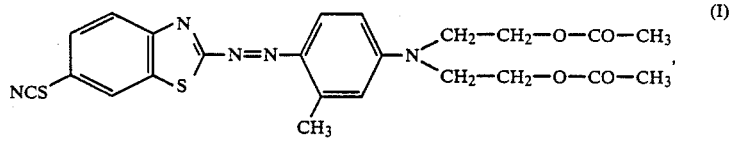
(I)

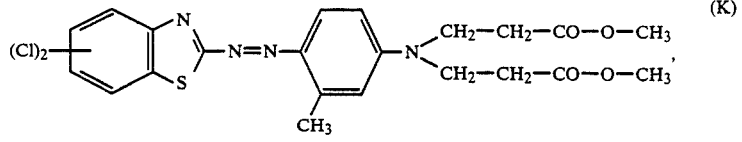
(K)

The individual dyestuffs on which the mixtures are based are known (cf. German Auslegeschriften Nos.

2,711,130 and 1,065,112 and GB No. 813,906 and 896,232).

The new dyestuff mixtures can be prepared by different methods:

1. by mixing the separately prepared and formulated individual dyestuff components,
2. by conjoint formulation of the separately prepared individual components.

If desired—if, for example, yellowish or bluish red dyestuffs of the formula (II) are used—moreover conventional shading dyestuffs can also be added.

The formulation for preparing saleable preparations is carried out by processes known per se.

The new dyestuff mixtures are suitable for the dyeing of polyester and cellulose ester fibres and are distinguished, while having a good fastness level, by a clear neutral red shade and a significantly lower temperature dependence of the affinity in the range between 100° and 130° C., in particular when deep shades are produced and short dyeing times are employed.

Furthermore, the mixtures according to the invention have excellent dispersion stability in the dyebaths compared to the individual dyestuffs, i.e. in particular in the dyeing in deep shades they have a much lower tendency to cause dyestuff precipitations on the dyed material, for example the wound packages in dyeing machines.

Besides, the dyestuffs are also suitable for the dyeing of synthetic polyamides.

In the examples below parts are by weight.

EXAMPLE 1

A dyeing preparation consisting of
17.5 parts of dyestuff A
7.5 parts of dyestuff B
11.4 parts of dyestuff C
63.6 parts of a commercially available dispersant is prepared by pearl milling, followed by spray-drying.

In an HT package-dyeing machine whose liquor is set to a pH of 4.5 with sodium phosphate and acetic acid, 100 parts of a polyester filament yarn are dyed at 130° C. for 30 minutes with 2.0 g of the dyeing preparation described above (liquor ratio 1:10). After this time, as much as 98% of the dyestuff have been absorbed and fixed. A clear uniformly red dyeing having good fastness properties is obtained.

EXAMPLE 2

In a dyebath containing 5 g/l of a commercially available carrier (e.g. based on aromatic carboxylic esters) and set to a pH of 4.5 with sodium phosphate and acetic acid, 100 parts of a polyester fabric are dyed at 90°-98° C. for 30 minutes with 2.0 g of the dyestuff preparation described above. A deep red dyeing having good fastness properties is obtained.

EXAMPLE 3

Polyester/cotton (1:1) knitwear is dyed in an HT dyeing machine with 2.8% (based on the weight of the material to be dyed) of a dyestuff formulation (consisting of 15 parts of A, 5 parts of B, 15 parts of C and 65 parts of a formulating assistant) by the following recipe at a liquor ratio of 6:1.

The dye liquor to which 1 g/l of dispersant has been added and which has been set to pH 4.5 is quickly heated to 70° C., and the dispersed dyestuff is then added through a sieve. The material is uniformly wetted by circulating it in the dye liquor for 5 minutes, the temperature of the dye liquor is raised to 130° C. at a rate of 3° C./min and left at this temperature for 30 minutes. After this period, 97% of the dyestuff are already absorbed by the polyester portion of the material. The liquor is cooled to 70° C., drawn off, and the material is rinsed once while cold.

A very deep neutral and clear red dyeing which has very good fastness properties is obtained on the polyester fibre. The cotton fibre has remained virtually white, making it possible to continue immediately with the dyeing of the cotton fibre portions by customary methods without any further cleaning inbetween.

EXAMPLE 4

Strong dyeings of Disperse Red 60 are also obtained by one of the dyeing processes described above by using mixtures of dyestuff A with dyestuff E, G, H, I or K.

EXAMPLE 5

The procedure of Example 1 is repeated, except that a mixture consisting of dyestuffs D and F which is adjusted to the hue of Disperse Red 60 is used, to give likewise a strong dyeing having good fastness properties.

We claim:
1. A dyestuff mixture containing
(a) 90–100% by weight of a dyestuff of the formula (I)

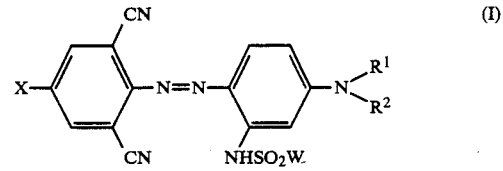

and
(b) 90–10% of a dyestuff of the formula (II)

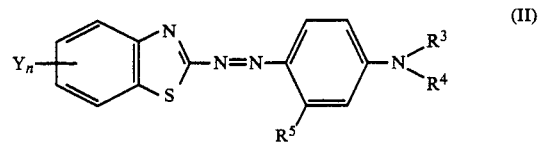

in which
n represents the numbers 1 or 2,
X represents $C_1$–$C_4$-alkyl, $C_1$–$C_4$-alkoxy or cyclohexyl,
Y represents Cl, $NO_2$, CN, SCN or $SO_2W$,
$R^1$, $R^2$ represent $C_1$–$C_6$-alkyl or $C_1$–$C_4$-alkoxy-$C_2$–$C_4$-alkyl,
$R^3$ represents $C_1$–$C_6$-alkyl or $R^4$,
$R^4$ represents $C_2H_4CN$, OCOW or $C_2H_4OCOOW$,
$R^5$ represents H or $CH_3$ and W represents $C_1$–$C_4$-alkyl or phenyl.

2. Dyestuff mixtures according to claim 1, characterized in that
X represents methyl, methoxy, t-butyl or cyclohexyl,
Y represents nitro,
$R^1$ and $R^2$ represent ethyl or n-propyl,
$R^3$ represents ethyl, n-butyl or $C_2H_4CN$,
$R^4$ represents $C_2H_4OCOW$ or, if $R^3$ is ethyl/n-butyl, $C_2H_4CN$,
$R^5$ represents H and W represents methyl, ethyl or phenyl.

3. Dyestuff mixtures according to claim 1, characterized in that

X represents methyl,

Y represents 6-nitro, $R^1$ and $R_2$ represent ethyl or n-propyl,

W represents methyl or ethyl and $R^3$, $R^4$, $R^5$ have the abovementioned meaning.

4. Dyestuff mixtures according to claim 1, characterized in that they contain the dyestuff of the formula (A)

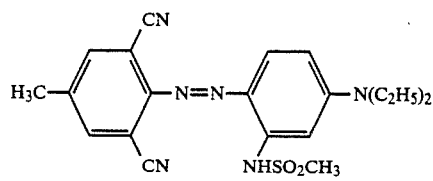

(A)

and/or of the formula (B)

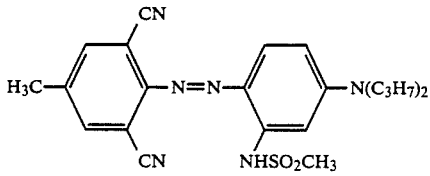

(B)

and the dyestuff of the formula (C)

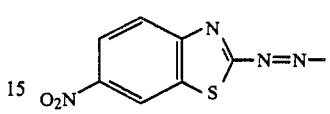

(C)

5. Dyestuff preparation containing dyestuff mixtures according to claim 1.

* * * * *

UNITED STATES PATENT AND TRADEMARK OFFICE
CERTIFICATE OF CORRECTION

PATENT NO. : 4,968,318

DATED : November 6, 1990

INVENTOR(S) : Wiegner et al.

It is certified that error appears in the above-identified patent and that said Letters Patent is hereby corrected as shown below:

Col. 6, line 39   Delete " 90-10% " and substitute -- 10-90% by weight --

Col. 6, line 56   Delete " OCOW " and substitute -- $C_2H_4OCOW$ --

Signed and Sealed this

Twentieth Day of April, 1993

Attest:

MICHAEL K. KIRK

*Attesting Officer*   Acting Commissioner of Patents and Trademarks